United States Patent Office 3,406,117
Patented Oct. 15, 1968

---

3,406,117
LIQUID OXYGEN-OZONE SOLUTION CONTAINING TRIFLUOROCHLOROMETHANE
Gerhard A. Cook, Clarence, N.Y., assignor to Union Carbide Corporation, a corporation of New York
No Drawing. Filed Nov. 19, 1956, Ser. No. 622,748
4 Claims. (Cl. 252—186)

This invention relates to liquid ozone solutions, and more particularly concerns homogeneous ozone solutions which are convenient and safe to handle.

Liquid oxygen has long been used as a diluent for ozone because of its high solvent power for ozone, and the fact that ozone and oxygen are miscible and compatible within certain proportions. As is known, a solution of ozone in liquid oxygen is capable of existing in either of two forms at −183° C. Below concentrations of about 24 weight percent (17.6 mole percent) ozone in liquid oxygen, the solution ingredients are compatibly miscible in all proportions, and form a relatively light phase homogeneous solution. This light ozone containing phase is resistant to explosion. At concentrations in excess of about 24 weight percent, the excess ozone forms a dense ozone-rich second phase with oxygen, which is immiscible with the relatively lighter ozone containing phase. The ozone-rich second phase is highly unstable, and produces a violent explosion when artificially stimulated by an electric spark or other means. Up to now, it has been impossible at −183° C. to formulate homogeneous concentrated solutions of ozone in oxygen, substantially above 24%, without encountering the formation of this highly dangerous, heavy layer of ozone-enriched second phase.

It is, therefore, an object of the present invention to provide an ozone solution having a greater stability at higher concentrations than present day ozone solutions.

Another object of the present invention is to provide in a solution wherein ozone and oxygen are major constituents, means for improving the stability of high ozone concentrations, particularly above approximately 24% by weight.

Other objects, features and advantages will be apparent from the following detailed description.

In the description that follows, unless otherwise specified, the term percentage is intended to refer to weight percentages.

The present invention comprises the discovery that certain additions to ozone-oxygen solutions effect a marked improvement in the stability of the solution, and enable the ozone concentration to be increased substantially above 24% to as much as about 40%, without the formation of an unsafe ozone-enriched second phase.

I have found that the addition of a fluorinated hydrocarbon consisting of one or more perhalogenated, fluorine-containing methanes to a solution of ozone in oxygen beneficially improves the solubility capacity of the oxygen for ozone without creating a hazardous, explosive condition. Liquid perhalogenated methane acts as a blending agent, and prevents the formation of a heavy ozone phase at ozone concentrations substantially beyond 24%.

Among the blending agents that may be employed in the practice of the invention, either singly or in combination, are liquefied perhalogenated methanes in which the halogen substituent is either fluorine or fluorine and chlorine, there being preferably at least two fluorine atoms per molecule of blending agent. Stated in other terms, the ozone blending agent may be fully substituted methanes, whose structures can be graphically represented by the formula: $C(Cl)_a(F)_b$ where $a$ is an integer having a value of from 0 to 2, and $b$ is an integer having a value of from 2 to 4, with the sum of $a$ and $b$ being 4. A number of other blending agents comprising liquid halogen-substituted hydrocarbons are satisfactory in most respects, but these suffer from the disadvantage that ozone tends to react with the C–H bonds and the C–C bonds.

According to the invention, the blending agent is added to an otherwise two-component solution of ozone in oxygen in such amounts that the ozone and oxygen components constitute the major constituents of the solution, and the blending agent is present only in minor amounts. This distinguishes the present application from my copending application, Ser. No. 622,747, filed Nov. 19, 1956, now U.S. Patent No. 2,975,035, wherein an ozone diluent consisting of a liquefied perhalogenated, fluorine-containing methane is a major constituent of an ozone solution, and oxygen is present in minor incidental amounts. In order to secure substantial benefits, the blending addition of the invention should range in amounts from as low as about 1% to as high as about 15%. This composition range of blending material is most effective in blending liquid ozone concentrations into compatible, miscible, and homogeneous solutions, particularly for ozone concentrations in liquid oxygen between about 24% and about 40%, without creating any hazardous explosive conditions.

For purposes of this invention in the preparation, handling, transportation and storage of ozone solutions, a temperature between about −184° C. and −140° C. has been found most desirable, although higher or lower temperatures may be employed if so desired.

The formation of the ozone-oxygen solutions of this invention may be accomplished in any of several ways. One method involves passing a gaseous mixture of oxygen and ozone, for example, the effluent from an ozonizer of the silent electrical discharge type, which normally would contain from 2 to 4 percent ozone, the balance being oxygen when pure oxygen has been used as the ozonizer charge gas, through liquid oxygen at its normal boiling point at atmospheric pressure. The ozone gas is dissolved in the liquid oxygen essentially completely and the ozone content of the liquid phase can be easily calculated from observed rates of flow of the gases entering the liquid container, weight change of the liquid and concentration of the ozone in the gas from the ozonizer. Another means of determining the ozone content of the liquid is by density of the liquid.

At −183° C. one can safely dissolve up to about 24 weight percent ozone in the liquid oxygen. A suitable amount of perhalogenated methane, between about 1% and about 15% of the ozone solution is then placed in a separate container, and introduced in vapor form into the ozone-oxygen solution where it condenses and dissolves. Thereafter, the ozone concentration in the ozone-oxygen solution may be increased substantially above about 24% by allowing the escape of the vapor phase, which is essentially all oxygen. The temperature at which concentration of the ozone solution is conducted may be at or below about −170° C., a temperature of about −183° C. being preferred.

Making the blended ozone solution of the invention is a convenient means of mixing concentrated liquid ozone with oxygen to give solutions containing more than about 24% ozone, without forming a second ozone-rich phase, and also helps to overcome a formidable safety handicap in the handling, storage, transportation and chemical reaction of ozone. The invention is useful as a source of ozone for carrying out chemical reactions, as by introducing the blended ozone solution into a reaction zone.

In order to indicate still more fully the nature of the present invention, the following typical examples are set forth, it being understood that these examples are presented as illustrative only, and are not intended to limit the scope of the invention.

Example I

A solution was prepared containing 36% ozone, 10.8% trifluorochloromethane, and the remainder oxygen. This solution did not explode when a high-voltage spark was passed through the liquid at −183° C.

Example II

A solution was prepared containing 34.7% ozone, 13.3% difluorodichloromethane, and the remainder oxygen. When artificially stimulated by an electric spark at −183° C., the solution did not explode.

Example III

In a similar manner the addition of 11% carbon tetrafluoride raised the spark explosive limit of an ozone-oxygen mixture at −183° C. from 24% ozone to above 36% ozone.

From the above examples it will be seen that ozone may be incorporated in an oxygen solvent with the aid of a blending agent, and still form a miscible, homogeneous solution, which is convenient for handling ozone in fairly concentrated form, particularly at concentrations between about 24% and 40% ozone. The blending agent may comprise a liquefied perhalogenated, fluorine-containing methane, the halogen substituent being either fluorine or chlorine, there being at least two fluorine atoms per molecule of blending material. An obvious advantage of the blended ozone solution of the invention is the factor of safety, the safe concentration of ozone having been substantially raised, and the explosive range having been considerably limited.

It will be understood that modifications and variations may be effected without departing from the spirit and scope of the novel concepts of the present invention.

What is claimed is:

1. A stable homogeneous liquid solution consisting of liquid oxygen as a solvent; liquid ozone as the solute; and as a liquid blending agent trichlorofluoromethane for preventing the formation of a heavy ozone rich phase and for promoting the stability and homogeneity of said liquid solution at ozone concentrations of from about 24 percent by weight to about 40 percent by weight.

2. A stable homogeneous liquid solution consisting of liquid oxygen as the solvent; liquid ozone as the solute; and trifluorchloromethane as a liquid blending agent for promoting the stability and homogeneity of said liquid solution at ozone concentrations above about 24 percent and up to about 40 percent by weight, said trifluorochloromethane being present in amounts from about 1 to about 15 percent by weight; the remainder being oxygen.

3. In the method of transporting and storing liquid ozone the improvement comprising incorporating from about 24 percent to about 40 percent by weight liquid ozone as a solute in liquid oxygen as a solvent and adding between 1 percent and 15 percent of a blending agent consisting of trifluorochloromethane and maintaining the resultant liquid solution of ozone, oxygen and blending agent in a refrigerated state.

4. A stable homogeneous liquid solution consisting of liquid ozone in liquid oxygen and containing at least about 1% by weight of trifluorochloromethane.

References Cited

UNITED STATES PATENTS

| 2,700,648 | 1/1955 | Thorpe et al. | 23—222 |
| 2,874,164 | 2/1959 | Hann | 23—222 X |
| 2,876,077 | 3/1959 | Haller | 23—222 |

FOREIGN PATENTS

| 729,010 | 4/1955 | Great Britain. |

OTHER REFERENCES

Mellor, Comprehensive Treatise on Inorganic and Theoretical Chemistry, vol. I, p. 894, pub. Longmans, Green & Co., New York (1922).

LELAND A. SEBASTIAN, *Primary Examiner.*